United States Patent
Karri et al.

(10) Patent No.: US 11,716,006 B2
(45) Date of Patent: Aug. 1, 2023

(54) ELECTRONIC CLOTH FOR GENERATING POWER

(71) Applicant: INTERNATIONAL BUSINESS MACHINES CORPORATION, Armonk, NY (US)

(72) Inventors: Venkata Vara Prasad Karri, Visakhapatnam (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 125 days.

(21) Appl. No.: 17/093,708

(22) Filed: Nov. 10, 2020

(65) Prior Publication Data

US 2022/0149713 A1    May 12, 2022

(51) Int. Cl.
| | |
|---|---|
| G06F 1/00 | (2006.01) |
| H02K 35/02 | (2006.01) |
| G01P 13/00 | (2006.01) |
| G06F 1/16 | (2006.01) |
| G06F 1/26 | (2006.01) |
| G06F 1/3206 | (2019.01) |

(52) U.S. Cl.
CPC ............. H02K 35/02 (2013.01); G01P 13/00 (2013.01); G06F 1/163 (2013.01); G06F 1/26 (2013.01); G06F 1/3206 (2013.01)

(58) Field of Classification Search
CPC ......... H02K 35/02; G01P 13/00; G06F 1/163; G06F 1/26; G06F 1/3206; H02J 50/001; A41D 1/002
See application file for complete search history.

(56) References Cited

U.S. PATENT DOCUMENTS

| | | | |
|---|---|---|---|
| 5,906,004 A | 5/1999 | Lebby | |
| 6,080,690 A | 6/2000 | Lebby | |
| 9,827,430 B1* | 11/2017 | Von Novak, III | ... A61N 1/3787 |
| 10,642,385 B1* | 5/2020 | Song | ...... G06F 1/1632 |
| 11,009,948 B2* | 5/2021 | Efrati | ...... G06F 3/011 |
| 2018/0307315 A1 | 10/2018 | Gong | |
| 2019/0138068 A1 | 5/2019 | Park | |
| 2019/0290925 A1* | 9/2019 | Gellman | ............ A61N 2/004 |
| 2019/0356243 A1 | 11/2019 | Zhi | |
| 2019/0386553 A1* | 12/2019 | Lin | .......... H02K 11/0094 |

(Continued)

FOREIGN PATENT DOCUMENTS

| | | |
|---|---|---|
| CN | 114461060 A | 5/2022 |
| EP | 3021454 A1 | 5/2016 |

(Continued)

OTHER PUBLICATIONS

European Combined Search and Examination Report, Application No. GB2115057.8, dated Apr. 20, 2022, 6 pages.

(Continued)

*Primary Examiner* — Xuxing Chen
(74) *Attorney, Agent, or Firm* — Michael O'Keefe

(57) ABSTRACT

The exemplary embodiments disclose a method, a computer program product, and a computer system for supplying power to a device. The exemplary embodiments may include generating power from movement of one or more metal coils relative to one or more pieces of cloth containing one or more electronic threads and transferring the generated power to a device.

20 Claims, 6 Drawing Sheets

(56) References Cited

U.S. PATENT DOCUMENTS

2021/0121683 A1* 4/2021 Stahmann .............. A61N 1/375
2021/0203255 A1* 7/2021 Marzano .............. H02P 25/064
2022/0154389 A1* 5/2022 Alexander ............. A41D 1/002

FOREIGN PATENT DOCUMENTS

EP        3719819 A1    10/2020
JP      2022077028 A     5/2022

OTHER PUBLICATIONS

Karri et al., Electronic Cloth for Generating Power, European Application No. GB2115057.8, Filed Oct. 21, 2021, 37 pages.
Karri et al., Electronic Cloth for Generating Power, German Application No. DE10 2021 127 305.6, Filed Oct. 21, 2021, 43 pages.
Disclosed Anonymously, "Magnets and Electricity," U.S. Energy Information Administration, https://www.eia.gov/energyexplained/electricity/magnets-and-electricity.php, Jan. 8, 2020, p. 1.
Disclosed Anonymously, U.S. Energy Information Administration, https://www.eia.gov/energyexplained/electricity/how-electricity-is-generated.php, Nov. 5, 2019, pp. 1-2.
Hamzelou, et al., "Electronic 'Tattoos' to Monitor Vital Signs," NewScientist—Technology, https://www.newscientist.com/article/dn20787-electronic-tattoos-to-monitor-vital-signs/, Aug. 11, 2011, pp. 1-3.
Kingma, "Glimpse: How Electronic Tattoos Will Change The World—And Ourselves," FUTUREISM, https://futurism.com/glimpse-electronic-tattoos, Sep. 17, 2018, pp. 1-3.
Mell et al., "The NIST Definition of Cloud Computing", National Institute of Standards and Technology, Special Publication 800-145, Sep. 2011, pp. 1-7.
Nunez, et al., "Energy Autonomous Electronic Skin," npj Flexible Electronics, www.nature.com/npjflexelectron, 2019, pp. 1-24.

* cited by examiner

ELECTRONIC CLOTH FOR GENERATING POWER

BACKGROUND

The exemplary embodiments relate generally to generating power, and more particularly to using electronic cloth to generate power.

Many people wear smart wearable devices that monitor the wearer. The smart wearable devices require power to monitor the wearer, and often need to be removed from the wearer's body such that their batteries can be charged. This results in inconveniences for the wearer and times where the smart wearable devices are not monitoring the wearer. Many people may desire a power source for a smart wearable device that does not require the smart wearable device to be removed from the wearer's body. For example, a person with a smart wearable that monitors their heart activity may wish the smart wearable could have a power source that does not require the smart wearable to be removed from their body and charged.

SUMMARY

The exemplary embodiments disclose a method, a computer program product, and a computer system for supplying power to a device. The exemplary embodiments may include generating power from movement of one or more metal coils relative to one or more pieces of cloth containing one or more electronic threads and transferring the generated power to a device.

BRIEF DESCRIPTION OF THE SEVERAL VIEWS OF THE DRAWINGS

The following detailed description, given by way of example and not intended to limit the exemplary embodiments solely thereto, will best be appreciated in conjunction with the accompanying drawings, in which.

The drawings are not necessarily to scale. The drawings are merely schematic representations, not intended to portray specific parameters of the exemplary embodiments. The drawings are intended to depict only typical exemplary embodiments. In the drawings, like numbering represents like elements.

DETAILED DESCRIPTION OF THE SEVERAL VIEWS OF THE DRAWINGS

Figure 1:
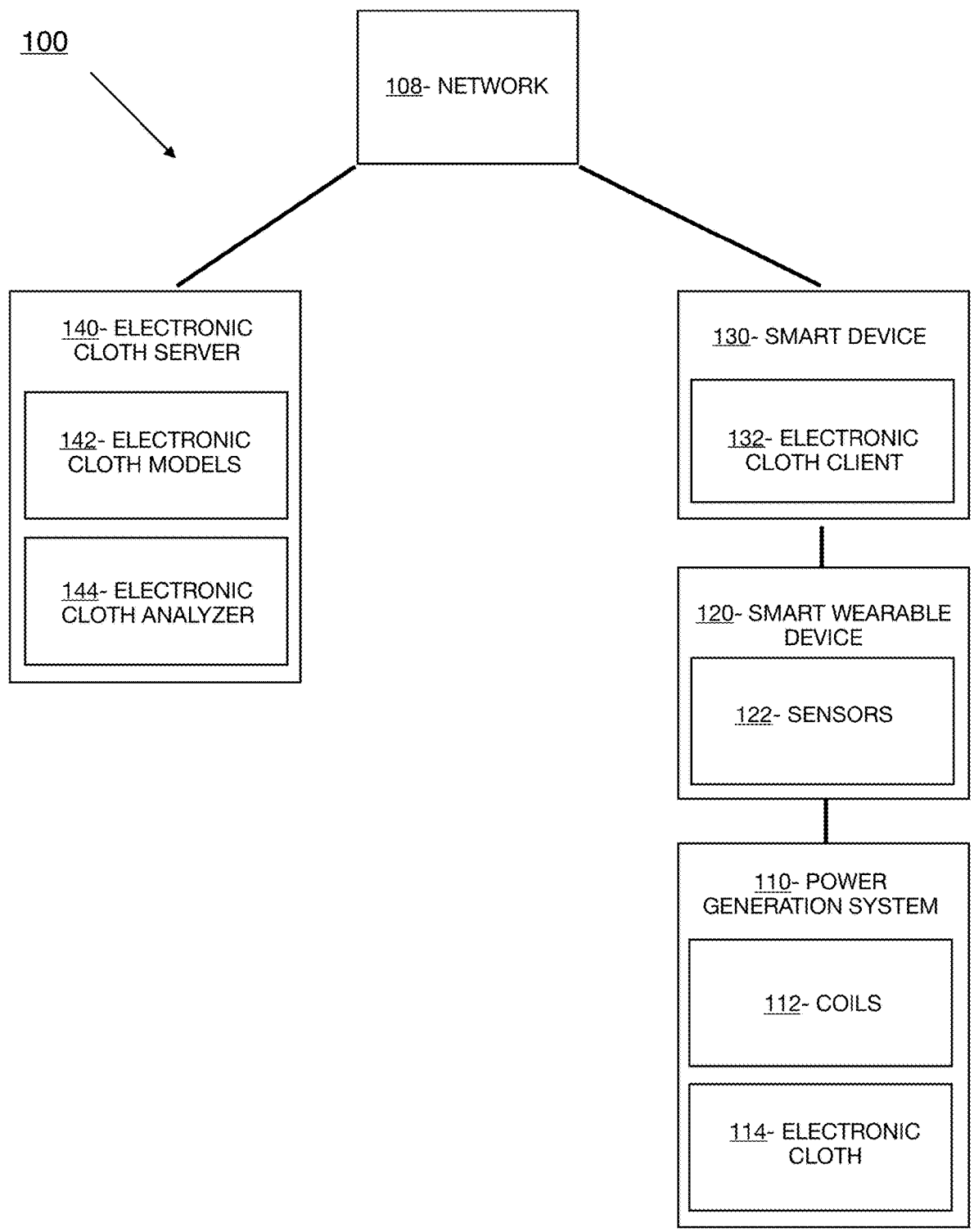
FIG. 1 depicts an exemplary schematic diagram of an electronic cloth system 100, in accordance with the exemplary embodiments.

Detailed embodiments of the claimed structures and methods are disclosed herein; however, it can be understood that the disclosed embodiments are merely illustrative of the claimed structures and methods that may be embodied in various forms. The exemplary embodiments are only illustrative and may, however, be embodied in many different forms and should not be construed as limited to the exemplary embodiments set forth herein. Rather, these exemplary embodiments are provided so that this disclosure will be thorough and complete, and will fully convey the scope to be covered by the exemplary embodiments to those skilled in the art. In the description, details of well-known features and techniques may be omitted to avoid unnecessarily obscuring the presented embodiments.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the interest of not obscuring the presentation of the exemplary embodiments, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is focused on the distinctive features or elements according to the various exemplary embodiments.

Many people wear smart wearable devices that monitor the wearer. The smart wearable devices require power to monitor the wearer, and often need to be removed from the wearer's body such that their batteries can be charged. This results in inconveniences for the wearer and times where the smart wearable devices are not monitoring the wearer. Many people may desire a power source for a smart wearable device that does not require the smart wearable device to be removed from the wearer's body. For example, a person with a smart wearable that monitors their heart activity may wish the smart wearable could have a power source that does not require the smart wearable to be removed from their body and charged.

Exemplary embodiments are directed to a method, computer program product, and computer system for supplying power to a device. In embodiments, a device may refer to a smart wearable device 120 or any smart device in contact with or near a user's body, and may include wearable devices such as smart watches, smart necklaces, smart rings, etc. and embeddable devices such as electronic tattoos. Power may be supplied to one or more smart wearable devices 120 for various purposes such as heart rate monitoring, blood oxygen level monitoring, brain wave monitoring, convenient control of a smart device (remote control for a computer, television, smartphone, etc.), etc. In general, it will be appreciated that embodiments described herein may relate to supplying power to any kind of device within any environment and for any motivation.

FIG. 1 depicts the electronic cloth system 100, in accordance with the exemplary embodiments. According to the exemplary embodiments, the electronic cloth system 100 may include one or more power generation systems 110, one or more smart wearable devices 120, a smart device 130, and an electronic cloth server 140, which may all be interconnected via a network 108. While programming and data of the exemplary embodiments may be stored and accessed remotely across several servers via the network 108, programming and data of the exemplary embodiments may alternatively or additionally be stored locally on as few as one physical computing device or amongst other computing devices than those depicted.

In the exemplary embodiments, the network 108 may be a communication channel capable of transferring data between connected devices. Accordingly, the components of the electronic cloth system 100 may represent network components or network devices interconnected via the network 108. In the exemplary embodiments, the network 108 may be the Internet, representing a worldwide collection of networks and gateways to support communications between devices connected to the Internet. Moreover, the network 108 may utilize various types of connections such as wired, wireless, fiber optic, etc. which may be implemented as an intranet network, a local area network (LAN), a wide area network (WAN), or a combination thereof. In further embodiments, the network 108 may be a Bluetooth network, a Wi-Fi network, or a combination thereof. In yet further embodiments, the network 108 may be a telecommunications network used to facilitate telephone calls between two or more parties comprising a landline network, a wireless network, a closed network, a satellite network, or a combination thereof. In general, the network 108 may represent any combination of connections and protocols that will support communications between connected devices.

In the exemplary embodiments, the power generation system 110 may include one or more power generation coils 112 and one or more pieces of electronic cloth 114. While the power generation system 110 is shown as a single device, in other embodiments, multiple power generation systems 110 may be utilized, each comprised of separated one or more coils 112 and one or more pieces of electronic cloth 114 working together. The power generation system 110 may be capable of generating power and may be capable of supplying the generated power to one or more smart wearable devices 120. The power generation system 110 is described in greater detail as a hardware implementation with reference to FIG. 4, as part of a cloud implementation with reference to FIG. 5, and/or as utilizing functional abstraction layers for processing with reference to FIG. 6.

In the exemplary embodiments, the power generation coils 112 may be one or more coils located on or beneath a user's skin. In embodiments, the coils 112 may be copper coils 112. In embodiments, the coils 112 may be embedded in a user's electronic tattoo located directly beneath the user's skin. In other embodiments, the coils 112 may be attached to the outer surface of a user's skin, for example by way of one or more adhesives.

In the exemplary embodiments, the electronic cloth 114 may be one or more pieces of cloth sewed or stitched with one or more magnetic sewing threads capable of creating a magnetic field. In embodiments, the electronic cloth 114 may be worn by a user such that one or more pieces of electronic cloth 114 are located in the vicinity of the coils 112, such that the coils 112 and electronic cloth 114 may collectively generate power. In embodiments, the electronic cloth 114 may be stitched into a bed sheet, cover, curtain, cloth, etc. that is not directly worn by a user.

In the exemplary embodiments, the smart wearable device 120 may include one or more sensors 122 and may be one or more smart watch, smart necklace, smart ring, smart speaker, smart assistant, enterprise server, laptop computer, notebook, tablet computer, netbook computer, personal computer (PC), desktop computer, server, personal digital assistant (PDA), rotary phone, touchtone phone, smart phone, mobile phone, virtual device, thin client, virtual reality device, augmented reality device, or any other electronic device or computing system capable of receiving and sending data to and from other computing devices. While each smart wearable device 120 is shown as a single device, in other embodiments, each smart wearable device 120 may be comprised of a cluster or plurality of computing devices, in a modular manner, etc., working together or working independently. The smart wearable device 120 is described in greater detail as a hardware implementation with reference to FIG. 4, as part of a cloud implementation with reference to FIG. 5, and/or as utilizing functional abstraction layers for processing with reference to FIG. 6.

In example embodiments, the sensors 122 may comprise a camera, microphone, light sensor, infrared sensor, movement detection sensor, pressure detection sensor, speedometer, accelerometer, gyroscope, global positioning system (GPS) sensor, thermometer, or other sensory hardware equipment. Moreover, the smart wearable device 120 may incorporate an array of the one or more sensors 122 such that information can be obtained by the sensors 122 in multiple directions, at different times/intervals, in different mediums/frequencies, and the like. For example, the smart wearable device 120 may be a pair of goggles that includes three forward-facing cameras that each record an adjacent sixty-degree viewing angle spanning a total of one-hundred and eighty degrees in front of a user. Moreover, data processing techniques may be implemented such that directional information of visual and audio data can be obtained based on signals received by each of the three sensors 122, such as trilateration and triangulation.

While the sensors 122 are depicted as integrated with the smart wearable device 120, in embodiments, the sensors 122 may be incorporated within an environment in which the electronic cloth system 100 is implemented. For example, the sensors 122 may be one or more microphones built into an auditorium, a camera built into a facility, speedometer, accelerometer, spectrometer, pedometer, etc. Moreover, data processing techniques may be implemented such that directional information of visual and audio data can be obtained based on signals received by each of the sensors 122, such as trilateration and triangulation. In other embodiments, the sensors 122 may be integrated with other smart devices, e.g., smart phones and laptops, within an environment implementing the electronic cloth system 100. In such embodiments, the sensors 122 may communicate directly with other networks and devices, such as the network 108. The sensors 122 are described in greater detail as a hardware implementation with reference to FIG. 4, as part of a cloud implementation with reference to FIG. 5, and/or as utilizing functional abstraction layers for processing with reference to FIG. 6.

In the example embodiment, the smart device 130 includes an electronic cloth client 132, and may be an enterprise server, a laptop computer, a notebook, a tablet computer, a netbook computer, a personal computer (PC), a desktop computer, a server, a personal digital assistant (PDA), a rotary phone, a touchtone phone, a smart phone, a mobile phone, a virtual device, a thin client, an IoT device, or any other electronic device or computing system capable of receiving and sending data to and from other computing devices. While the smart device 130 is shown as a single device, in other embodiments, the smart device 130 may be comprised of a cluster or plurality of computing devices, in a modular manner, etc., working together or working independently. The smart device 130 is described in greater detail as a hardware implementation with reference to FIG. 4, as part of a cloud implementation with reference to FIG. 5, and/or as utilizing functional abstraction layers for processing with reference to FIG. 6.

The electronic cloth client 132 may act as a client in a client-server relationship. The electronic cloth client 132 may also be a software and/or hardware application capable of communicating with and providing a user interface for a user to interact with a server, for example the electronic cloth server 140, via the network 108. Moreover, in the example embodiment, the electronic cloth client 132 may be capable of transferring data from the smart wearable device 120 and/or the sensors 122 between the smart device 130 and other devices via the network 108. In embodiments, the electronic cloth client 132 utilizes various wired and wireless connection protocols for data transmission and exchange, including Bluetooth, 2.4 gHz and 5 gHz internet, near-field communication, Z-Wave, Zigbee, etc. The electronic cloth client 132 is described in greater detail with respect to FIG. 2.

In the exemplary embodiments, the electronic cloth server 140 may include one or more electronic cloth models 142 and an electronic cloth analyzer 144, and may act as a server in a client-server relationship with the electronic cloth client 132. The electronic cloth server 140 may be an enterprise server, a laptop computer, a notebook, a tablet computer, a netbook computer, a PC, a desktop computer, a server, a PDA, a rotary phone, a touchtone phone, a smart phone, a mobile phone, a virtual device, a thin client, an IoT device, or any other electronic device or computing system capable of receiving and sending data to and from other computing devices. While the electronic cloth server 140 is shown as a single device, in other embodiments, the electronic cloth server 140 may be comprised of a cluster or plurality of computing devices, working together or working independently. The electronic cloth server 140 is described in greater detail as a hardware implementation with reference to FIG. 4, as part of a cloud implementation with reference to FIG. 5, and/or as utilizing functional abstraction layers for processing with reference to FIG. 6.

In the exemplary embodiments, the electronic cloth models 142 may be one or more algorithms modelling a correlation between one or more features (and/or collected data) and one or more specifications of the power generation system 100 and/or one or more smart wearable devices 120. In the example embodiment, the electronic cloth models 142 may be generated using machine learning methods, such as neural networks, deep learning, hierarchical learning, Gaussian Mixture modelling, Hidden Markov modelling, and K-Means, K-Medoids, or Fuzzy C-Means learning, etc., and may model a likelihood of the one or more features (and/or collected data) being indicative of a power specification of the power generation system 100 and/or power specification of one or more smart wearable devices 120. In embodiments, such features may relate to power generation and power consumption, and include power generation rate, power consumption rate, times of day when power is generated and/or consumed, days of the week when power is generated and/or consumed, etc. The electronic cloth models 142 may weight the features based on an effect that the features have on determining a power specification of the power generation system 100 and/or one or more smart wearable devices 120. The electronic cloth models 142 are described in greater detail with reference to FIG. 2.

In the exemplary embodiments, the electronic cloth analyzer 144 may be a software and/or hardware program capable of collecting data, extracting one or more features from the data, and applying one or more models to the extracted features to determine power generation system 110 specifications and/or one or more smart wearable devices 120 specifications. The electronic cloth analyzer 144 may additionally be capable of configuring a session, generating power via one or more coils 112 and pieces of electronic cloth 114, and powering one or more smart wearable device 120 with the generated power. The electronic cloth analyzer 144 may further collect data from one or more smart wearable devices 120 and analyze and/or summarize the collected data. Moreover, the electronic cloth analyzer 144 may be further configured for notifying a user of data according to user preferences. The electronic cloth analyzer 144 is described in greater detail with reference to FIG. 2.

Figure 2:
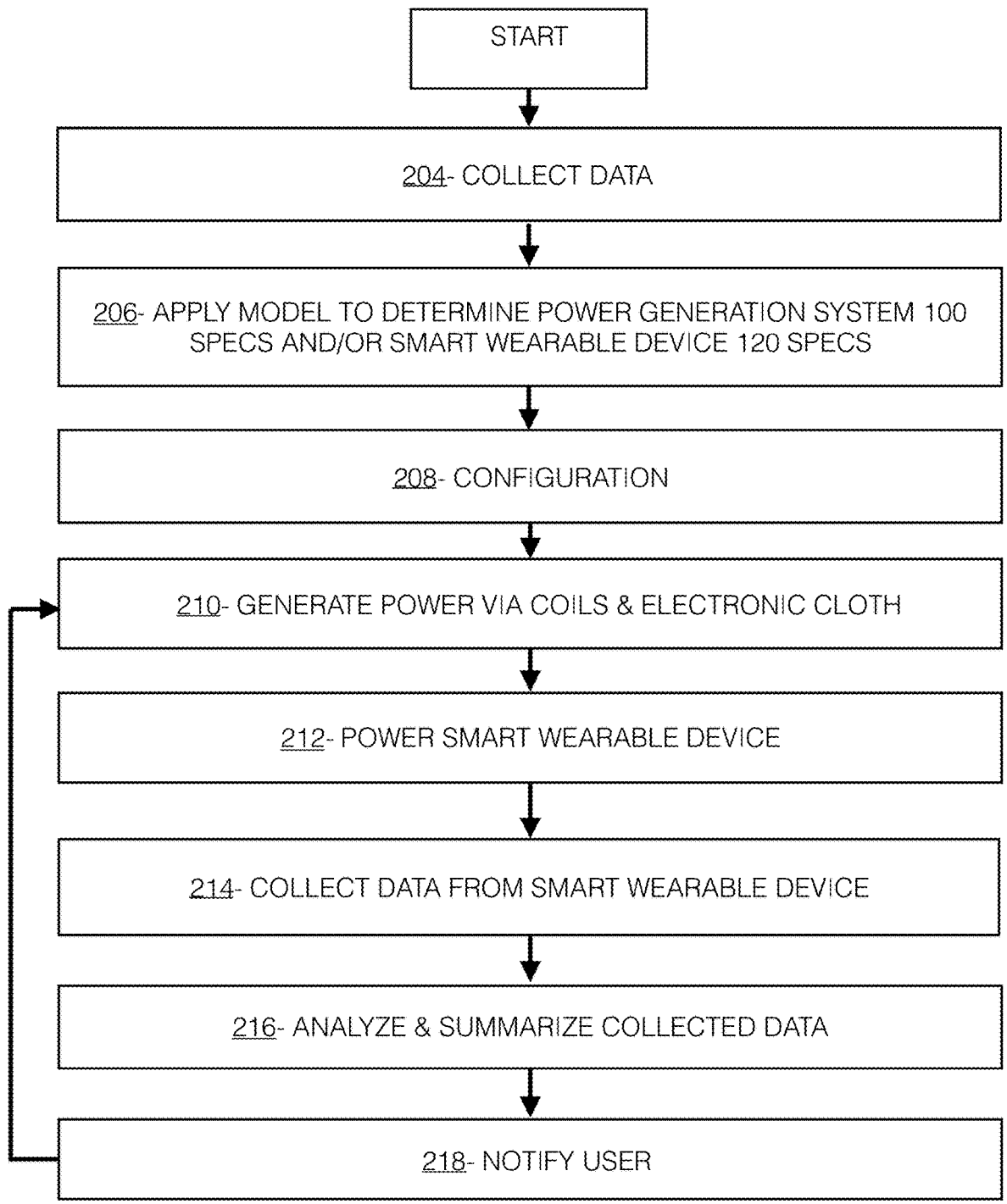
FIG. 2 depicts an exemplary flowchart illustrating the operations of an electronic cloth analyzer 144 of the electronic cloth system 100 in supplying power to a smart wearable device 120, in accordance with the exemplary embodiments.

FIG. 2 depicts an exemplary flowchart illustrating the operations of an electronic cloth analyzer 144 of the electronic cloth system 100 in supplying power to one or more devices, in accordance with the exemplary embodiments.

The electronic cloth analyzer 144 may collect data from the user (step 204). In embodiments, the electronic cloth analyzer 144 may collect data via user input such as a type or power consumption of one or more smart wearable devices 120, a number of coils 112, diameter of coils 112, type of coils 112, number of threads of electronic cloth 114, thickness of threads of electronic cloth 114, type of threads of electronic cloth 114, etc. Collected data may additionally include a duration of time and/or frequency that a user intends to wear a power generation system 110 and/or one or more smart wearable devices 120. Collected data may be extracted as features for purposes of applying one or more models. For example, the electronic cloth analyzer 144 may collect data from a user specifying that the user intends to wear a heartrate monitor that requires 5 watts of power all of the time. The electronic cloth analyzer 144 may alternatively collect data from a user specifying that the user intends to wear a heartrate monitor with their power generation system that generates an average of 10 watts of power. The electronic cloth analyzer 144 may extract collected data as one or more features.

To further illustrate the operations of the electronic cloth analyzer 144, reference is now made to an illustrative example where the electronic cloth analyzer 144 collects data via user input specifying that the user wishes to wear a smart watch requiring 10 watts of power for approximately 16 hours per day.

The electronic cloth analyzer 144 may apply one or more electronic cloth models 142 to the collected data/extracted features to determine one or more specifications of the power generation system 110 and/or one or more smart wearable devices 120. The one or more specifications of the power generation system 110 may include a required number of coils 112, type of coils, area of electronic cloth 114, type of electronic cloth 114, etc. As previously mentioned, the one or more electronic cloth models 142 may be generated through machine learning techniques such as neural networks. In embodiments, the one or more electronic cloth models 142 may be trained at initialization and/or through the use of a feedback loop to weight features such that features shown to have a greater correlation with determining one or more specifications of the power generation system 110 and/or one or more smart wearable devices 120 are weighted greater than those features that are not. Based on the extracted features and weights associated with such extracted features, the electronic cloth analyzer 144 may determine one or more specifications of the power generation system 110 and/or one or more smart wearable devices 120, such as a number of required coils 112, type of coils, area of required electronic cloth 114, type of electronic cloth 114, etc.

With reference to the previously introduced example where the electronic cloth analyzer 144 collects data via user input specifying that the user wishes to wear a smart watch requiring 10 watts of power for approximately 16 hours per day, the electronic cloth analyzer 144 applies the electronic cloth models 142 to determine that the user requires a power generation system 110 consisting of five copper coils 112 and an area of four square inches to power the smart watch requiring 10 watts of power for approximately 16 hours per day.

The electronic cloth analyzer 144 may receive and/or perform a configuration (step 208). The electronic cloth analyzer 144 may receive a user configuration by receiving a user registration and user preferences. The user registration may be uploaded by a user, i.e., a person using or wearing the power generation system 110 or smart wearable device 120 of the electronic cloth system 100 or administrator, i.e., a person overseeing the user's usage of the electronic cloth system 100 (such as a parent or guardian of the user, employer of the user, etc.) and the configuration may be received by the electronic cloth analyzer 144 via the electronic cloth client 132 and the network 108. Receiving the user registration may involve referencing a user profile via user login credentials, internet protocol (IP) address, media access control (MAC) address, etc., or receiving user input information such as a name, date of birth, gender, address/geographic information, phone number, email address, company name, device serial numbers, smart device 130 type, one or more smart wearable device 120 types, sensors 122 types, types/number of/locations/positions of one or more coils 112 and electronic cloth 114, and the like. Receiving a user registration may also involve receiving or extracting data from databases such as user health data, calendar data, etc. Lastly, the electronic cloth analyzer 144 may receive a configuration of the one or more sensors 122, whether they be fixed to one or more devices (e.g., the smart device 130 or one or more of the smart wearable devices 120) or fixed within an environment in which the electronic cloth system 100 is implemented.

During configuration, the electronic cloth analyzer 144 may further receive user preferences (step 204 continued). User preferences may include preferences for the manner in which the electronic cloth analyzer 144 should notify the user of analyzed and/or summarized data. For example, user preferences may specify notifying a user of the user's heart rate via audio and video feedback on the user's smart device 130 only when the user's heart rate is faster than one hundred beats per minute. In another example, the user may specify that a summary of their daily average heart rates for the week is to be presented to the user via visual feedback on the user's smart device 130 every Saturday.

With reference to the previously introduced example where the electronic cloth analyzer 144 applies the electronic cloth models 142 to determine that the user requires a power generation system 110 consisting of five copper coils 112 and an area of four square inches to power the smart watch requiring 10 watts of power for approximately 16 hours per day, the electronic cloth analyzer receives a user registration via user upload including the user's name, type of smartphone smart device 130, type of heart rate monitor smart wearable device 120, and type of sensors 122 including a heartbeat sensor. The electronic cloth analyzer further receives types, numbers, and locations of coils 112 embedded in an electronic tattoo on the user's arm, and electronic cloth 114 sewn into the user's shirt positioned directly over the electronic tattoo on the user's arm (specifications according to those determined in step 206). The electronic cloth analyzer 144 also receives user preferences via user upload specifying that the electronic cloth analyzer 144 is to notify the user via audio and visual feedback on the user's smart phone when the user's heart rate is faster than one hundred beats per minute.

The electronic cloth analyzer 144 may generate power from one or more coils 112 and pieces of electronic cloth 114 (step 210). In embodiments, the one or more coils 112 may be copper coils 112 or coils 112 tattooed beneath a user's skin, and the one or more pieces of electronic cloth 114 may comprise one or more magnetic sewing threads stitched in the electronic cloth 114. In embodiments, the user's movement may result in movement of the one or more coils 112 relative to the electronic cloth 114 such that one or more magnetic fields are generated, created, and/or changed. In embodiments, the change in one or more magnetic fields may be stored as power in the one or more coils 112 and/or one or more smart wearable devices 120 (i.e., stored in one or more batteries of one or more smart wearable devices 120). In embodiments, power generated by the power generation system 110 may supply power directly to one or more smart wearable devices 120 such that the one or more smart wearable devices 120 can function (i.e., collect data via one or more sensors 122). Power generation via the one or more coils 112 and pieces of electronic cloth 114 is discussed further with reference to FIG. 3.

With reference to the previously introduced example where the electronic cloth analyzer 144 receives a configuration, the electronic cloth analyzer 144 generates power via the coils 112 of the user's electronic tattoo and electronic cloth 114 of the user's shirt.

The electronic cloth analyzer 144 may power one or more smart wearable devices 120 with the generated power (step 212). As previously mentioned, changes in one or more magnetic fields may be stored as power in the one or more coils 112 and/or one or more smart wearable devices 120 (i.e., stored in one or more batteries of one or more smart wearable devices 120). In embodiments, power generated by the power generation system 110 may supply power directly to one or more smart wearable devices 120 such that the one or more smart wearable devices 120 can function (i.e., collect data via one or more sensors 122). In embodiments, the power generation system 110 may be connected to one or more smart wearable devices 120 to facilitate the transfer of power from the power generation system 110 to the one or more smart wearable devices 120. For example, one or more coils 112 may be connected to a heartbeat monitor via a copper wire to facilitate the transfer of generated power. In embodiments, power generated by the power generation system 110 may be transferred to the one or more smart wearable devices 120 wirelessly, for example via one or more wireless charging methods. In embodiments, the electronic cloth analyzer 144 may power one or more smart wearable devices 120 with the generated power in an alternative manner.

With reference to the previously introduced example where the electronic cloth analyzer 144 generates power via the coils 112 of the user's electronic tattoo and electronic cloth 114 of the user's shirt, the electronic cloth analyzer 144 powers the user's heart rate monitor with the generated power via a copper wire connecting the coils 112 to the heart rate monitor.

Upon the one or more smart wearable devices 120 being powered by the generated power of the power generation system 110, the electronic cloth analyzer 144 may collect data from the one or more smart wearable devices 120 (step 214). In embodiments, the one or more smart wearable devices 120 may collect data such as biometric data (i.e., heart rate, temperature, blood oxygen level, calories burned, movement rate, etc.) via one or more sensors 122, which may include one or more heart rate monitors located on a user's chest, an input device for control of other smart devices (i.e., user's movement of hand directs a mouse on a computer, directs movement in a video game, etc.), etc. In embodiments, the electronic cloth analyzer 144 may collect global positioning services (GPS) data. For example, the electronic cloth analyzer 144 may collect GPS data for purposes of locating a user, locating places of interest near a user (i.e., nearby doctors' offices, gas stations, restaurants, grocery stores, etc.), determining an average level of movement/mobility of a user, etc. In embodiments, the electronic cloth analyzer 144 may continuously collect data of the user via the one or more sensors 122 as long as the smart wearable device 120 has enough power to function.

With reference to the previously introduced example where the electronic cloth analyzer 144 powers the user's heart rate monitor with the generated power via a copper wire connecting the coils 112 to the heart rate monitor, the electronic cloth analyzer 144 collects heart rate data from the user's heart rate monitor.

The electronic cloth analyzer 144 may analyze and/or summarize the collected data (step 216). In embodiments, the electronic cloth analyzer 144 may analyze and/or summarize data using one or more electronic cloth models 142 according to one or more user preferences. In embodiments, the electronic cloth analyzer 144 may analyze and/or summarize data using one or more averages, maximum value, minimum value, maximum rate of increase, minimum rate of increase, etc. according to user preferences. For example, if a user specifies that they would like to know their average heart rate for each day during configuration, the electronic cloth analyzer 144 may average the user's heart rate data across each day. In another example, if a user species that they would like to know their highest heart rate of each day during configuration, the electronic cloth analyzer 144 may determine the user's maximum heart rate value for each day. In embodiments, the electronic cloth analyzer 144 may not need to analyze and/or summarize data. For example, if a user specifies that they desire a constant feed of their real-time heart rate displayed on their smart device 130, the electronic cloth analyzer 144 may not need to analyze and/or summarize data, and instead may proceed directly to notifying the user of the data. In another embodiment, if a user specifies that they would like a map of their real-time location displayed on their smart device 130, the electronic cloth analyzer 144 may not need to analyze and/or summarize previously collected GPS data, and instead may proceed directly to displaying a map of the user's location.

With reference to the previously introduced example where the electronic cloth analyzer 144 collects heart rate data from the user's heart rate monitor, the electronic cloth analyzer 144 analyzes the data in real-time to monitor for cases when the user's heart rate is above 100 beats per minute according to the user's preferences. The electronic cloth analyzer 144 detects the user's heart rate at 98 beats per minute for two minutes and then suddenly at 105 beats per minute.

The electronic cloth analyzer 144 may notify the user of the analyzed and/or summarized data. In embodiments, the electronic cloth analyzer 144 may notify the user of data specified by the user preferences. In embodiments, the electronic cloth analyzer 144 may notify the user of collected data without needing to analyze and/or summarize the collected data. The electronic cloth analyzer 144 may convey data to the user in the form of audio, video, text, or any other manner via the smart device 130 and/or one or more smart wearable device 120.

With reference to the previously introduced example where the electronic cloth analyzer 144 analyzes the data in real-time to monitor for cases when the user's heart rate is above 100 beats per minute according to the user's preferences and detects the user's heart rate at 98 beats per minute for two minutes and then suddenly at 105 beats per minute, the electronic cloth analyzer 144 notifies the user via audio and visual feedback on their smart phone of the user's 105 beats per minute heartbeat after two minutes.

Figure 3:
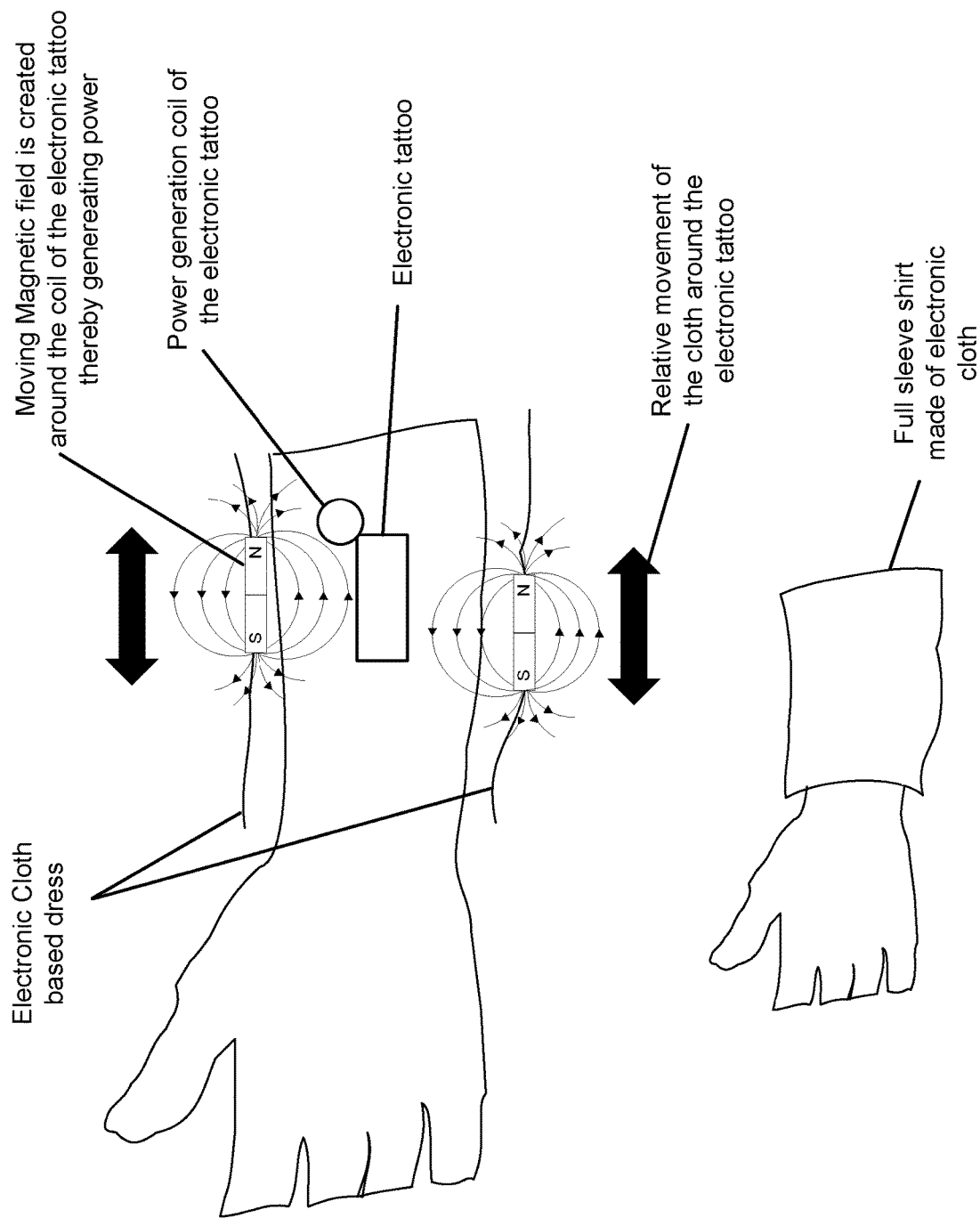
FIG. 3 depicts an exemplary schematic diagram of a power generation system 110 of the electronic cloth system 100 in generating power to power a smart wearable device 120, in accordance with the exemplary embodiments.

FIG. 3 depicts an exemplary schematic diagram of a power generation system 110 of the electronic cloth system 100 in generating power to power a smart wearable device 120, in accordance with the exemplary embodiments. In embodiments, the one or more coils 112 may be copper coils 112 or coils 112 tattooed beneath a user's skin, and the one or more pieces of electronic cloth 114 may comprise one or more magnetic sewing threads stitched in the electronic cloth 114. In embodiments, a user's movement may result in movement of the one or more coils 112 relative to the electronic cloth 114 such that one or more magnetic fields are generated, created, and/or changed. In embodiments, the change in one or more magnetic fields may be stored as electromagnetic induction-based power in the one or more coils 112 and/or one or more smart wearable devices 120 (i.e., stored in one or more batteries of one or more smart wearable devices 120). In embodiments, power generated by the power generation system 110 may supply power directly to one or more smart wearable devices 120 such that the one or more smart wearable devices 120 can function (i.e., collect data via one or more sensors 122). In embodiments, power generation and/or consumption rates may be tracked and used to determine a number/type/location of coils 112 and/or pieces of electronic cloth 114 needed to power one or more smart wearable devices 120, and/or to determine specifications of the one or more smart wearable devices 120 such as battery storage capacity.

In embodiments, a washing machine for clothes comprising one or more pieces of electronic cloth 114 may have an array of coils 112 around the washing drum of the washing machine. The one or more pieces of electronic cloth 114 and coils 112 may be waterproofed. When a washing cycle is performed with the clothes comprising one or more pieces of electronic cloth 114, the movement of the coils 112 in relation to the electronic cloth 114 may generate power. Generated power may be stored in the coils 112 for later use by a user to power one or more smart wearable devices 120.

Figure 4:
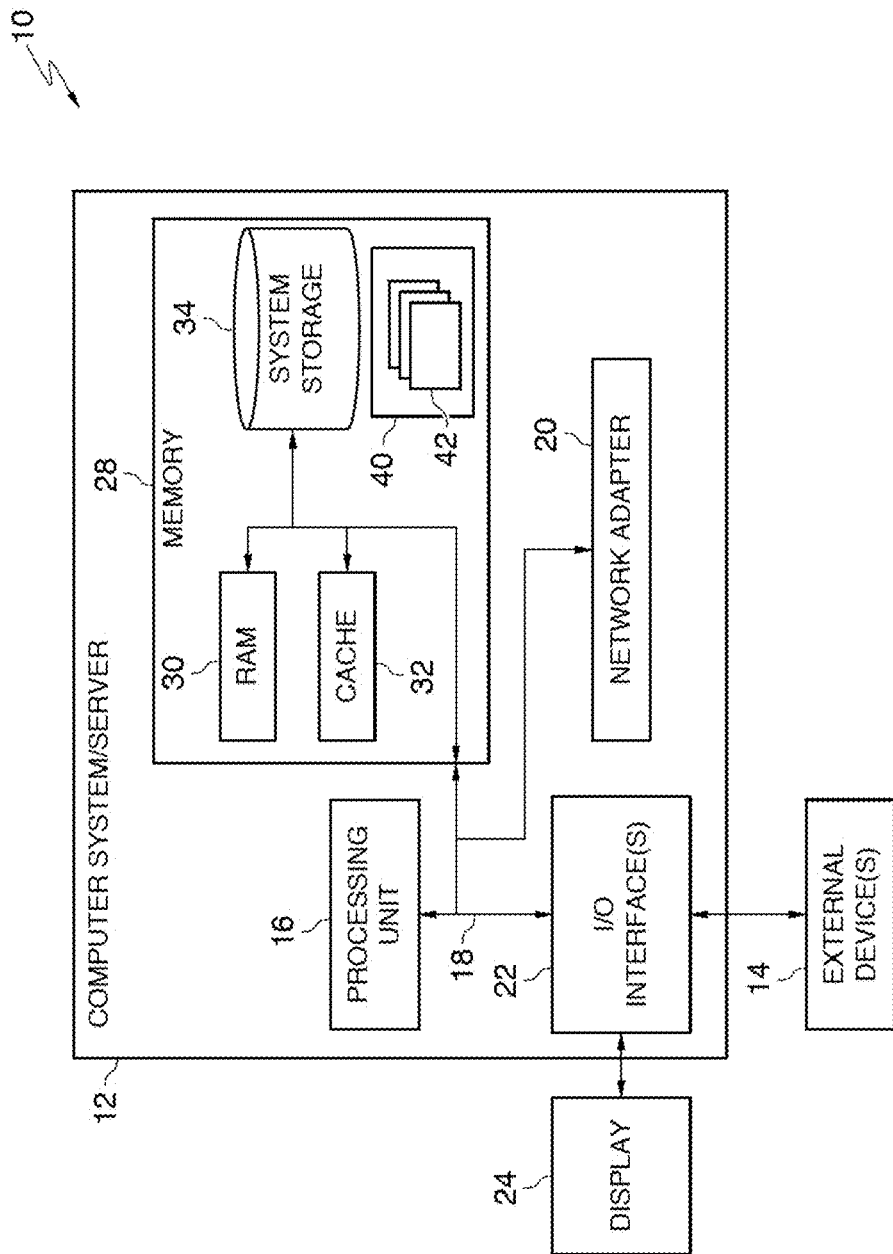
FIG. 4 depicts an exemplary block diagram depicting the hardware components of the electronic cloth system 100 of FIG. 1, in accordance with the exemplary embodiments.

FIG. 4 depicts a block diagram of devices within the electronic cloth system 100 of FIG. 1, in accordance with the exemplary embodiments. It should be appreciated that FIG. 4 provides only an illustration of one implementation and does not imply any limitations with regard to the environments in which different embodiments may be implemented. Many modifications to the depicted environment may be made.

Devices used herein may include one or more processors 02, one or more computer-readable RAMs 04, one or more computer-readable ROMs 06, one or more computer readable storage media 08, device drivers 12, read/write drive or interface 14, network adapter or interface 16, all interconnected over a communications fabric 18. Communications fabric 18 may be implemented with any architecture designed for passing data and/or control information between processors (such as microprocessors, communications and network processors, etc.), system memory, peripheral devices, and any other hardware components within a system.

One or more operating systems 10, and one or more application programs 11 are stored on one or more of the computer readable storage media 08 for execution by one or more of the processors 02 via one or more of the respective RAMs 04 (which typically include cache memory). In the illustrated embodiment, each of the computer readable storage media 08 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Devices used herein may also include a RAY drive or interface 14 to read from and write to one or more portable computer readable storage media 26. Application programs 11 on said devices may be stored on one or more of the portable computer readable storage media 26, read via the respective R/W drive or interface 14 and loaded into the respective computer readable storage media 08.

Devices used herein may also include a network adapter or interface 16, such as a TCP/IP adapter card or wireless communication adapter (such as a 4G wireless communication adapter using OFDMA technology). Application programs 11 on said computing devices may be downloaded to the computing device from an external computer or external storage device via a network (for example, the Internet, a local area network or other wide area network or wireless network) and network adapter or interface 16. From the network adapter or interface 16, the programs may be loaded onto computer readable storage media 08. The network may comprise copper wires, optical fibers, wireless transmission, routers, firewalls, switches, gateway computers and/or edge servers.

Devices used herein may also include a display screen 20, a keyboard or keypad 22, and a computer mouse or touchpad 24. Device drivers 12 interface to display screen 20 for imaging, to keyboard or keypad 22, to computer mouse or touchpad 24, and/or to display screen 20 for pressure sensing of alphanumeric character entry and user selections. The device drivers 12, RAY drive or interface 14 and network adapter or interface 16 may comprise hardware and software (stored on computer readable storage media 08 and/or ROM 06).

The programs described herein are identified based upon the application for which they are implemented in a specific one of the exemplary embodiments. However, it should be appreciated that any particular program nomenclature herein is used merely for convenience, and thus the exemplary embodiments should not be limited to use solely in any specific application identified and/or implied by such nomenclature.

Based on the foregoing, a computer system, method, and computer program product have been disclosed. However, numerous modifications and substitutions can be made without deviating from the scope of the exemplary embodiments. Therefore, the exemplary embodiments have been disclosed by way of example and not limitation.

It is to be understood that although this disclosure includes a detailed description on cloud computing, implementation of the teachings recited herein are not limited to a cloud computing environment. Rather, the exemplary embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
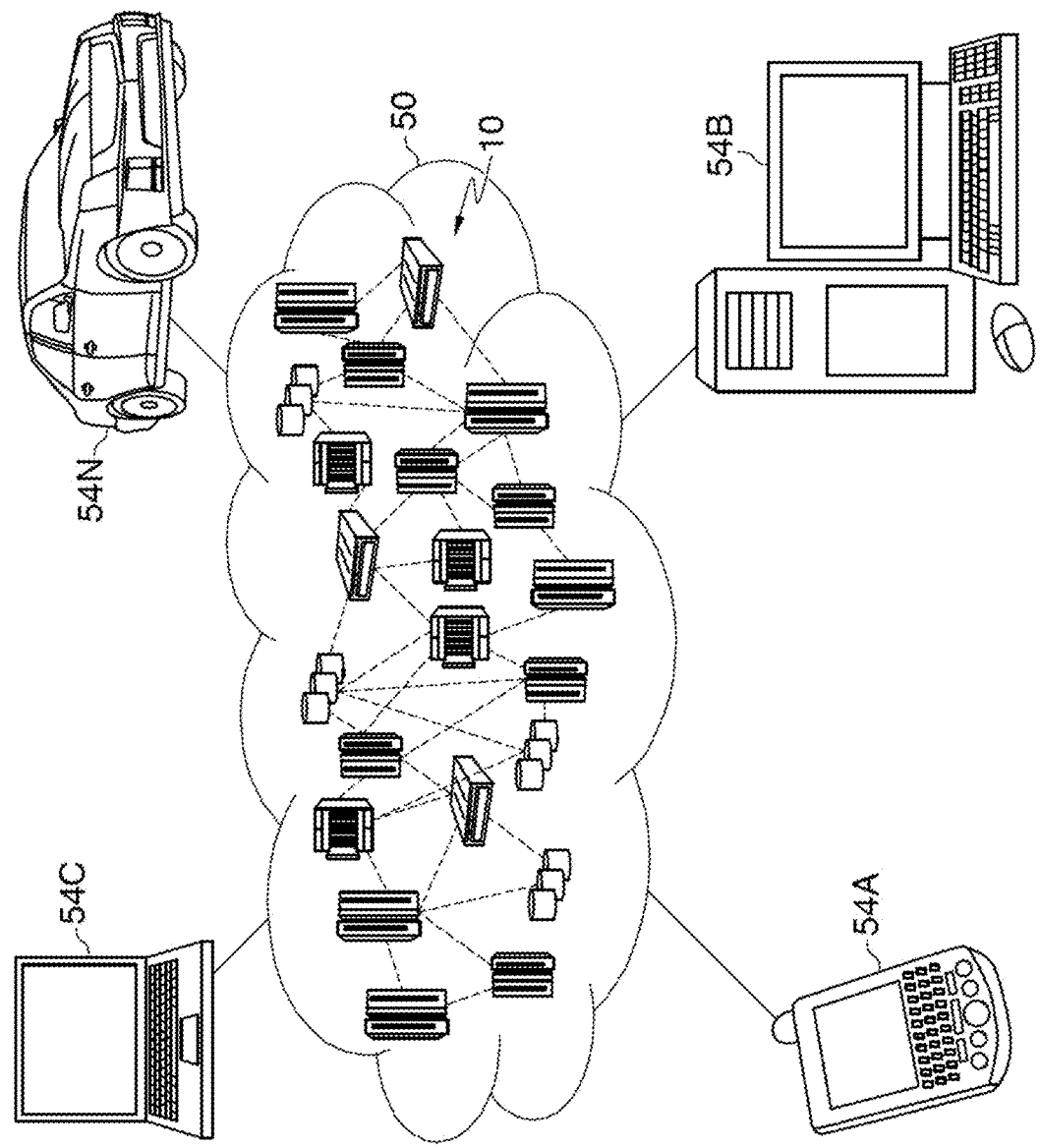
FIG. 5 depicts a cloud computing environment, in accordance with the exemplary embodiments.

Referring now to FIG. 5, illustrative cloud computing environment 50 is depicted. As shown, cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 40 and cloud computing environment 50 can communicate with any type of computerized device over any type of network and/or network addressable connection (e.g., using a web browser).

Figure 6:
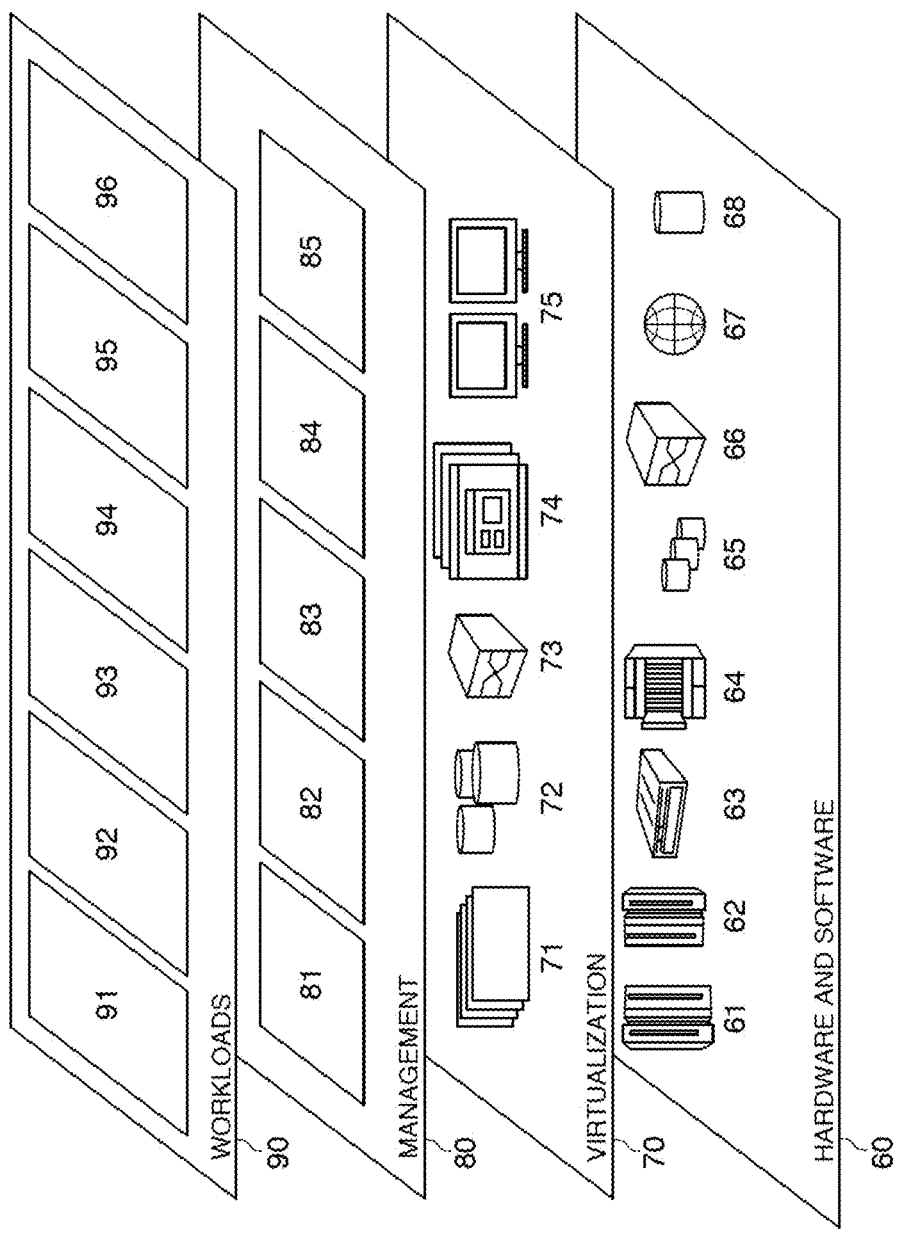
FIG. 6 depicts abstraction model layers, in accordance with the exemplary embodiments.

Referring now to FIG. 6, a set of functional abstraction layers provided by cloud computing environment 50 (FIG. 5) is shown. It should be understood in advance that the components, layers, and functions shown in FIG. 6 are intended to be illustrative only and the exemplary embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and power generation 96.

The exemplary embodiments may be a system, a method, and/or a computer program product at any possible technical detail level of integration. The computer program product may include a computer readable storage medium (or media) having computer readable program instructions thereon for causing a processor to carry out aspects of the exemplary embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the exemplary embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the exemplary embodiments.

Aspects of the exemplary embodiments are described herein with reference to flowchart illustrations and/or block diagrams of methods, apparatus (systems), and computer program products according to the exemplary embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various exemplary embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for supplying power to a device, the method comprising:
   generating power from movement of one or more pieces of electronic cloth in relation to one or more metal coils located around a washing drum of a washing machine during performance of a washing cycle, wherein the one or more pieces of electronic cloth contain one or more magnetic sewing threads stitched in each piece of electronic cloth, and wherein the one or more metal coils and the one or more pieces of electronic cloth are waterproof;
   storing the generated power in the one or more metal coils for use by a device; and
   transferring the generated power to the device.

2. The method of claim 1, wherein the method further comprises:
   collecting data from the device; and
   presenting the collected data to a user of the device.

3. The method of claim 2, wherein the method further comprises:
   extracting one or more features from the collected data;
   applying one or more models to the extracted features to determine information of interest to the user; and
   presenting the information of interest to the user.

4. The method of claim 1, wherein the method further comprises:
   collecting data of the one or more metal coils, the one or more pieces of cloth, or the device from a user;
   extracting one or more features from the collected data; and
   applying one or more models to the extracted features to determine one or more specifications of the one or more metal coils, the one or more pieces of cloth, or the device.

5. The method of claim 1, wherein:
   the one or more coils are copper coils or are one or more tattoos applied to a user's skin;
   the one or more pieces of cloth comprise one or more of an article of clothing, a bed sheet, a bed cover, or a curtain; and
   the device is a smart wearable device.

6. The method of claim 1, wherein:
the one or more coils and one or more pieces of cloth are waterproof; and
the one or more coils are located around a washing drum of a washing machine.

7. The method of claim 4, wherein:
the one or more specifications of the one or more metal coils include a number of coils, diameter of coils, and type of coils;
the one or more specifications of the one or more pieces of cloth include a number of threads, thickness of threads, and type of threads; and
the one or more specifications of the device include a type of device and power consumption of device.

8. A computer program product for supplying power to a device, the computer program product comprising:
one or more non-transitory computer-readable storage media and program instructions stored on the one or more non-transitory computer-readable storage media capable of performing a method, the method comprising:
generating power from movement of one or more pieces of electronic cloth in relation to one or more metal coils located around a washing drum of a washing machine during performance of a washing cycle, wherein the one or more pieces of electronic cloth contain one or more magnetic sewing threads stitched in each piece of electronic cloth, and wherein the one or more metal coils and the one or more pieces of electronic cloth are waterproof;
storing the generated power in the one or more metal coils for use by a device; and
transferring the generated power to the device.

9. The computer program product of claim 8, wherein the method further comprises:
collecting data from the device; and
presenting the collected data to a user of the device.

10. The computer program product of claim 9, wherein the method further comprises:
extracting one or more features from the collected data;
applying one or more models to the extracted features to determine information of interest to the user; and
presenting the information of interest to the user.

11. The computer program product of claim 8, wherein the method further comprises:
collecting data of the one or more metal coils, the one or more pieces of cloth, or the device from a user;
extracting one or more features from the collected data; and
applying one or more models to the extracted features to determine one or more specifications of the one or more metal coils, the one or more pieces of cloth, or the device.

12. The computer program product of claim 8, wherein:
the one or more coils are copper coils or are one or more tattoos applied to a user's skin;
the one or more pieces of cloth comprise one or more of an article of clothing, a bed sheet, a bed cover, or a curtain; and
the device is a smart wearable device.

13. The computer program product of claim 8, wherein:
the one or more coils and one or more pieces of cloth are waterproof; and
the one or more coils are located around a washing drum of a washing machine.

14. The computer program product of claim 11, wherein:
the one or more specifications of the one or more metal coils include a number of coils, diameter of coils, and type of coils;
the one or more specifications of the one or more pieces of cloth include a number of threads, thickness of threads, and type of threads; and
the one or more specifications of the device include a type of device and power consumption of device.

15. A computer system for supplying power to a device, the computer system comprising:
one or more computer processors, one or more computer-readable storage media, and program instructions stored on the one or more of the computer-readable storage media for execution by at least one of the one or more processors capable of performing a method, the method comprising:
generating power from movement of one or more pieces of electronic cloth in relation to one or more metal coils located around a washing drum of a washing machine during performance of a washing cycle, wherein the one or more pieces of electronic cloth contain one or more magnetic sewing threads stitched in each piece of electronic cloth, and wherein the one or more metal coils and the one or more pieces of electronic cloth are waterproof;
storing the generated power in the one or more metal coils for use by a device; and
transferring the generated power to the device.

16. The computer system of claim 15, wherein the method further comprises:
collecting data from the device; and
presenting the collected data to a user of the device.

17. The computer system of claim 16, wherein the method further comprises:
extracting one or more features from the collected data;
applying one or more models to the extracted features to determine information of interest to the user; and
presenting the information of interest to the user.

18. The computer system of claim 15, wherein the method further comprises:
collecting data of the one or more metal coils, the one or more pieces of cloth, or the device from a user;
extracting one or more features from the collected data; and
applying one or more models to the extracted features to determine one or more specifications of the one or more metal coils, the one or more pieces of cloth, or the device.

19. The computer system of claim 15, wherein:
the one or more coils are copper coils or are one or more tattoos applied to a user's skin;
the one or more pieces of cloth comprise one or more of an article of clothing, a bed sheet, a bed cover, or a curtain; and
the device is a smart wearable device.

20. The computer system of claim 15, wherein:
the one or more coils and one or more pieces of cloth are waterproof; and
the one or more coils are located around a washing drum of a washing machine.

* * * * *